US012768783B2

(12) United States Patent
Morgan et al.

(10) Patent No.: US 12,768,783 B2
(45) Date of Patent: Oct. 20, 2026

(54) OPTICAL EXTINCTION ANALYZER WITH CONTINUOUS AIRFLOW SAMPLING

(71) Applicant: Nikira Labs Inc., Mountain View, CA (US)

(72) Inventors: David P. Morgan, Mountain View, CA (US); Manish Gupta, Mountain View, CA (US)

(73) Assignee: Nikira Labs Inc., Mountain View, CA (US)

( * ) Notice: Subject to any disclaimer, the term of this patent is extended or adjusted under 35 U.S.C. 154(b) by 400 days.

(21) Appl. No.: 18/511,780

(22) Filed: Nov. 16, 2023

(65) Prior Publication Data

US 2025/0164393 A1 May 22, 2025

(51) Int. Cl.
*G01N 21/53* (2006.01)
*G01J 3/02* (2006.01)
(Continued)

(52) U.S. Cl.
CPC ............ *G01N 21/53* (2013.01); *G01J 3/0291* (2013.01); *G01J 3/42* (2013.01); *G01N 1/22* (2013.01);
(Continued)

(58) Field of Classification Search
CPC .......... G01N 21/53; G01N 1/22; G01N 15/06; G01N 21/03; G01N 21/031; G01N 21/05;
(Continued)

(56) References Cited

U.S. PATENT DOCUMENTS 3,812,330 A * 5/1974 Bowman ................. G06M 3/00 324/76.47
4,793,709 A 12/1988 Jabr et al.
(Continued)

FOREIGN PATENT DOCUMENTS

CN 109781639 A * 5/2019 ............. G01N 21/31
CN 114166766 A * 3/2022 ............. G01N 21/01
(Continued)

OTHER PUBLICATIONS

Smith, Jared D., and Dean B. Atkinson. "A portable pulsed cavity ring-down transmissometer for measurement of the optical extinction of the atmospheric aerosol." Analyst 126.8 (2001): 1216-1220. (Year: 2001).*

(Continued)

*Primary Examiner* — Michelle M Iacoletti
*Assistant Examiner* — Noah J. Haney
(74) *Attorney, Agent, or Firm* — LOZA & LOZA, LLP; David S. Sarisky

(57) ABSTRACT

A system for measuring optical extinction includes an optical cell having an optical cavity, a sampling fan, a duct system having an interior, and a controller. The sampling fan is associated with a sample outlet of the optical cell, while the interior of the duct system is in fluid communication with an optical cavity of the optical cell. The duct system includes an unfiltered inlet and a filtered inlet with an inline duct fan arranged to draw a sample from a sample source and force the sample through a filter into the interior of the duct system. The controller is configured to cycle the inline duct fan on and off while the sampling fan is continuously on to thereby cycle filtered samples and unfiltered samples through the optical cavity. Continuous operation of the sampling fan provides the same airflow conditions through the optical cavity for both filtered and unfiltered samples.

18 Claims, 6 Drawing Sheets

BASELINE MEASUREMENT

(51) Int. Cl.

| | |
|---|---|
| ***G01J 3/42*** | (2006.01) |
| ***G01N 1/22*** | (2006.01) |
| ***G01N 1/24*** | (2006.01) |
| ***G01N 15/00*** | (2024.01) |
| ***G01N 15/06*** | (2024.01) |
| ***G01N 15/075*** | (2024.01) |
| ***G01N 21/03*** | (2006.01) |
| ***G01N 21/05*** | (2006.01) |
| ***G01N 21/31*** | (2006.01) |
| ***G01N 21/85*** | (2006.01) |

(52) U.S. Cl.

CPC ............. *G01N 15/06* (2013.01); *G01N 21/03* (2013.01); *G01N 21/031* (2013.01); *G01N 21/05* (2013.01); *G01J 3/021* (2013.01); *G01N 1/2205* (2013.01); *G01N 1/2247* (2013.01); *G01N 2001/227* (2013.01); *G01N 1/24* (2013.01); *G01N 2001/245* (2013.01); *G01N 2015/0046* (2013.01); *G01N 15/075* (2024.01); *G01N 2021/3125* (2013.01); *G01N 2021/8578* (2013.01)

(58) Field of Classification Search

CPC ...... G01N 1/2205; G01N 1/2247; G01N 1/24; G01N 15/075; G01N 2001/227; G01N 2001/245; G01N 2015/0046; G01N 2021/3125; G01N 2021/8578; G01J 3/0291; G01J 3/42; G01J 3/021

USPC .......................................................... 356/437

See application file for complete search history.

(56) References Cited

U.S. PATENT DOCUMENTS

| | | | | | |
|---|---|---|---|---|---|
| 5,291,265 | A | | 3/1994 | Kebabian | |
| 5,432,610 | A | | 7/1995 | King et al. | |
| 5,528,040 | A | | 6/1996 | Lehmann | |
| 5,912,740 | A | | 6/1999 | Zare et al. | |
| 6,167,107 | A | * | 12/2000 | Bates | G01N 15/02 377/10 |
| 6,795,190 | B1 | | 9/2004 | Paul et al. | |
| 7,307,716 | B2 | | 12/2007 | Silver | |
| 8,284,403 | B2 | * | 10/2012 | Carson | G01N 21/33 356/437 |
| 9,395,345 | B2 | * | 7/2016 | Singh | G08B 17/113 |
| 9,702,802 | B2 | * | 7/2017 | Ajay | G01N 1/2205 |
| 9,709,491 | B1 | | 7/2017 | Murphy et al. | |
| 10,048,196 | B2 | | 8/2018 | Harb et al. | |
| 10,345,213 | B2 | * | 7/2019 | Cooper | G01N 1/2273 |
| 2016/0223437 | A1 | * | 8/2016 | Ajay | G01N 1/26 |
| 2023/0078598 | A1 | * | 3/2023 | Li | G01N 21/031 356/300 |

FOREIGN PATENT DOCUMENTS

| | | | | | |
|---|---|---|---|---|---|
| CZ | 2015457 | A3 | * | 1/2017 | G01N 21/17 |
| DE | 102019103885 | A1 | * | 8/2020 | G01N 21/53 |

OTHER PUBLICATIONS

Baynard, Tahllee, et al. "Design and application of a pulsed cavity ring-down aerosol extinction spectrometer for field measurements." Aerosol Science and Technology 41.4 (2007): 447-462. (Year: 2007).*

Courtois, Jérémie; "High-speed off-axis Cavity Ring-Down Spectroscopy with a re-entrant configuration for spectral resolution enhancement"; Optical Society of America; (Mar. 1, 2010).

Gupta, Manish; "Optimization of Off-Axis ICOS and Applications to Flow Tube Kinetics"; (Dec. 31, 2003).

Herndon et al.; "Astigmatic Multipass Absorption Cells Lightweight Astigmatic Multipass Absorption Cell—AMAC-36LW"; Aerodyne Research; https://www.aerodyne.com/product/astigmatic-multipass-absorption-cells/; Printed Apr. 28, 2023; 6 pages.

Ideal Spectroscopy; "Cavity Ring Down Spectroscopy Cell, 50 cm Pathlength, Adjustable Mounts for 1 in. OD Optics, Mounting Hardware Included."; https://www.idealspectroscopy.com/printRegproductbidealspectroscopy.asp?pid=1103; Printed Apr. 28, 2023; 2 pages.

Kasyutich, V.L.; "Laser beam patterns of an optical cavity formed by two twisted cylindrical mirrors"; (Jan. 5, 2009).

Liu, Jianhui; "Design and research of built-in sample cell with multiple optical reflections"; (Oct. 24, 2017).

Mcmanus et al.; "Astigmatic mirror multipass absorption cells for long-path-length spectroscopy"; Appl. Opt. 34; 3336-3348 (1995).

Schwarm et al.; "Calibration-free breath acetone sensor with interference correction based on wavelength modulation spectroscopy near 8.2 μm"; Appl. Phys; B 126, 9 (2020).

Wang; "Development of a portable cavity-enhanced absorption spectrometer for the measurement of ambient NO3 and N2O5: experimental setup, lab characterizations, and field applications in a polluted urban environment"; (Sep. 27, 2016).

* cited by examiner

OPTICAL EXTINCTION ANALYZER WITH CONTINUOUS AIRFLOW SAMPLING

TECHNICAL FIELD

The present disclosure relates generally to absorption spectroscopy, and more particularly, to an optical extinction analyzer (OEA) with continuous airflow sampling.

BACKGROUND

In known methods of measuring optical extinction (also referred to as optical loss) using cavity ringdown spectroscopy, a baseline measurement of optical loss is obtained while an optical cavity of an optical cell is filled with filtered air. A sample measurement of optical loss is then obtained by bringing unfiltered sample air into the optical cavity using a sampling fan. Repeated baseline measurements (while the optical cavity is filled with filtered air) and sample measurements (while the optical cavity is filled with unfiltered sample air) are obtained by cycling the sampling fan on and off.

With reference to FIG. 1, a known analyzer for measuring optical extinction includes an optical cell having two opposed mirrors aligned along a longitudinal axis of a structure, e.g., a tube. The interior space bounded by the structure and the surface of the mirrors forms an optical cavity of the optical cell. A filtered air input is associated with each end of the cavity and arranged to route filtered air onto the front surface of each mirror and along a filtered-air path in the direction of the longitudinal axis of the cavity. While measuring optical extinction, filtered air is continuously injected into the optical cavity through these inputs for purposes of keeping the mirrors clean. The optical cell also includes opposed sidewall openings that provide a path for sample air that is generally transverse to the longitudinal axis of the cavity. A sampling fan is arranged relative to the optical cavity to draw sample air through the cavity along the sample-air path. The filtered air and sample air can have different temperatures.

With this known analyzer, baseline measurements are obtained while the sampling fan is off and sample measurements are obtained while the fan is on. Due to the on/off cycling of the sampling fan, baseline measurements are obtained under different airflow conditions, e.g., flow rate (also referred to as velocity) and flow path, than the sample measurements. Furthermore, because the filtered air and unfiltered sample air can have different temperatures, the baseline measurements and sample measurements may be obtained under different temperature conditions. More specifically, when the sample fan is off, only filtered air having a temperature equal to the temperature of the filtered air source is input to the optical cavity through the filtered air inputs. The filtered air moves along the surface of the mirror at a flow rate and into a filtered-airflow path along the longitudinal axis of the optical cavity. When the sample fan is on, unfiltered sample air having a temperature different than the filtered air is brought into the optical cavity by the sample fan at a flow rate different than the flow rate of the filtered air. The sample air moves along a sample-airflow path transverse to the filtered-airflow path of the filtered air, which continues to be input through the filtered air inputs.

Due to the transverse airflow conditions of the filtered air and the sample air, the different flow rates of the filtered air and the sample air, and the different temperatures of the filtered air and the sample air, air having different temperatures are mixed in the region of space in the cavity where the laser beam is propagating. When the laser beam encounters the region of mixed temperature and airflow, differential refractivity of the laser beam results, e.g., the laser beam goes off-axis. The differential refractivity resulting from the different airflow conditions and temperature conditions can contribute inaccuracies in the optical extinction measurements on the order of 1-30 $Mm^{-1}$.

Thus, there is a need for an optical extinction analyzer that substantially reduces or eliminates inaccuracies in the optical extinction measurements due to differential refractivity of the laser beam.

SUMMARY

In one aspect, the disclosure relates to a system for measuring optical extinction. The system includes an optical cell, a duct system, a sampling fan, and a controller. The optical cell has an optical cavity, a sample inlet, and a sample outlet. The duct system has an interior that is in fluid communication with the optical cavity through the sample inlet of the optical cell. The duct system includes an unfiltered inlet, and a filtered inlet with a filter and an inline duct fan that is arranged to draw a sample from a sample source and force the sample through the filter. The sampling fan is associated with the sample outlet. The controller is configured to cycle the inline duct fan on and off while the sampling fan is on to thereby cycle filtered samples and unfiltered samples through the optical cavity.

In another aspect, the disclosure relates to a method of measuring optical extinction. The method includes continuously drawing air from a duct system into and through an optical cavity under same airflow conditions, during a measurement period that includes alternating first times and second times. The method further includes intaking, during the first times of the measurement period, filtered air into the duct system such that only filtered air is drawn from the duct system into and through the optical cavity during the first times. The method further includes, refraining from intaking filtered air into the duct system during the second times of the measurement period, such that only unfiltered air is drawn from the duct system into and through the optical cavity during the second times.

In another aspect, the disclosure relates to a duct system for use with an optical cell having an optical cavity and a sample inlet. The duct system includes a filtered inlet, a filter associated with the filtered inlet, an inline duct fan associated with the filtered inlet and arranged to draw air from a sample source and force the air through the filter, an unfiltered inlet arranged relative to the filtered inlet such that the air forced through the filter can follow an outlet flow path that exits the interior of the duct system through the unfiltered inlet, and a duct outlet configured to couple with the sample inlet of the optical cell and arranged relative to the filtered inlet and the unfiltered inlet to provide a sample flow path for the air into the optical cavity of the optical cell.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Disclosed herein is a system for measuring optical extinction. The system (also referred to as an optical extinction analyzer) includes an optical cell having an optical cavity, a sampling fan, a duct system having an interior, and a controller. The sampling fan is associated with a sample outlet of the optical cell, while the interior of the duct system is in fluid communication with an optical cavity of the optical cell through a sample inlet of the optical cell. The duct system includes an unfiltered inlet and a filtered inlet. A filter and an inline duct fan are arranged relative to the filtered inlet to draw a sample, e.g., air or gas, from a sample source and to force the sample through the filter into the interior of the duct system. The controller is configured to cycle the inline duct fan on and off while the sampling fan is continuously on to thereby cycle filtered samples (for baseline measurements) and unfiltered samples (for sample measurements) through the optical cavity.

Continuous operation of the sampling fan results in continuous airflow through the optical cavity for both the filtered samples and the unfiltered samples, where the air flows under same airflow conditions. These same airflow conditions include the flow rate of air through the optical cavity and the flow path of air through the optical cavity. The "same flow rate" means the flow rate of the filtered samples through the optical cavity and the flow rate of unfiltered samples through the optical cavity are equal or within 5 percent of each other. The "same flow path" means the path of filtered samples through the optical cavity and the path of unfiltered samples through the optical cavity are identical.

As disclosed further below, the continuous drawing of air from the duct system improves the accuracy of low extinction coefficient values, reduces the problems associated with mirror cleanliness, and eliminates the need for optical cavity opening/closing mechanisms. The system can be deployed to monitor both indoor and outdoor visibility and air quality, and can be used to measure the wavelength dependence of the optical extinction coefficient, which would otherwise suffer issues due to wavelength-dependent refractivity.

Figure 2:
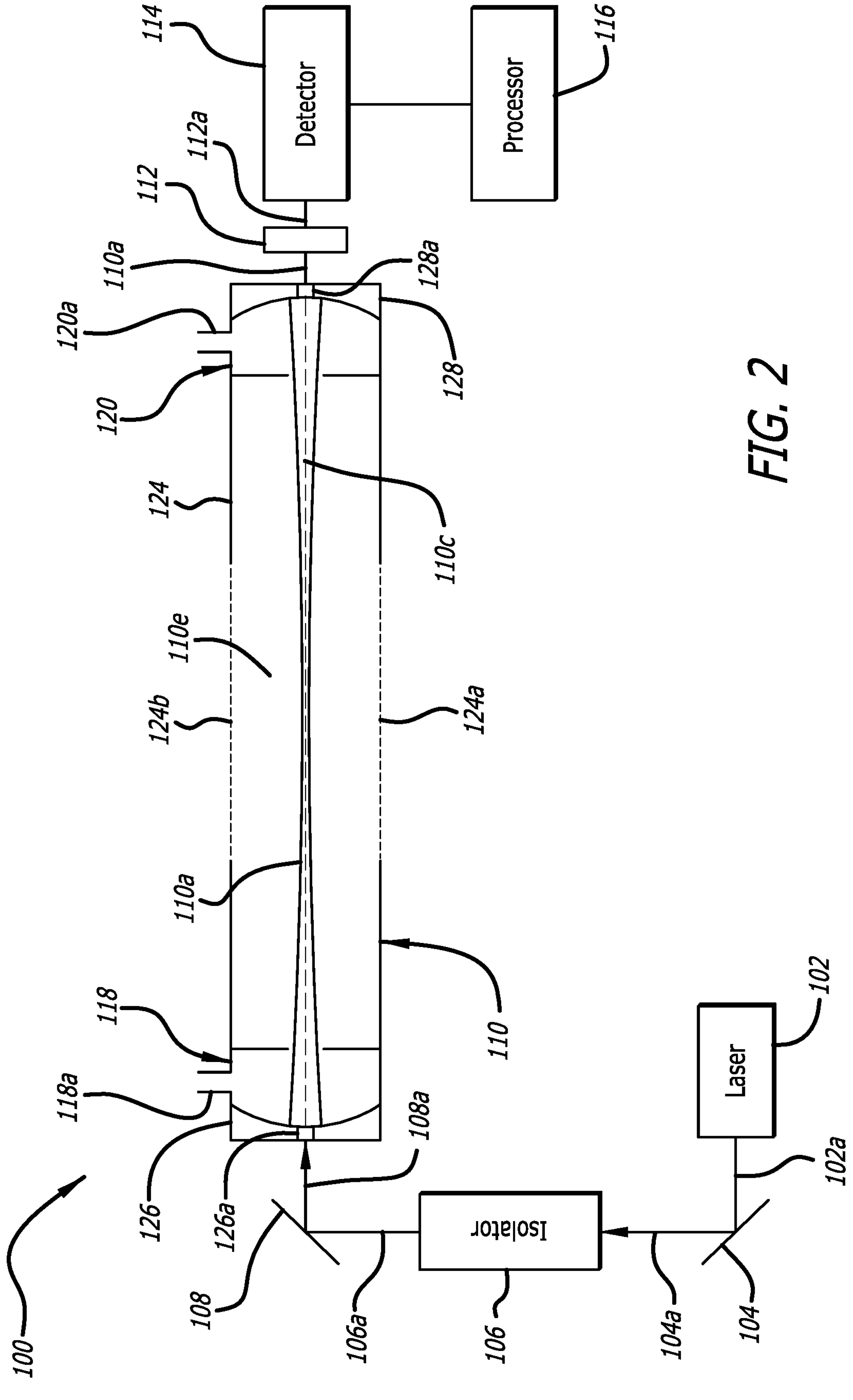
FIG. 2 is a schematic illustration of components of an optical extinction analyzer.

With reference to FIG. 2, components of an optical extinction analyzer include a light source 102, an optical isolator 106, optical components 104, 108, an optical cell 110, a collimator 112, a photodetector 114 and a processor 116.

The light source 102 generates the primary optical beam along path 102*a*. Continuous or pulsed lasers are suitable. The light source 102 generates light of a wavelength corresponding to an optical region of interest in a sample. For gases containing particles, the wavelength of light generated by the light source 102 corresponds to the optical region where information on light extinction can be obtained. For traces gases, the wavelength of light generated by light source 102 corresponds to optical region with an absorption feature. The light source 102 can be, for example, a 674 nm diode laser, a 450 nm diode laser, a 450 nm light emitting diode.

The optical isolator 106 is positioned in path 104*a* of the optical beam to reduce optical feedback caused by back reflections into the optical beam along path 104*a*, and to control the polarization of the optical beam along path 104*a*. The optical isolator 106 can be, for example, a Faraday isolator.

The optical component 104 is placed in front of the light source 102 to direct the optical beam along path 104*a* to the optical isolator 106. The optical component 108 is placed in front of the optical isolator 106 to direct the optical beam along path 106*a* to the optical cell 110. The optical beam from the light source 102 may also be directed to the optical cell 110 by other light directing means such as fiber optic delivery. The optical path from the light source 102 to optical cell 110 may also include optics to focus the light, or otherwise improve the coupling of light into the optical cell.

The optical cell 110 includes an optical cavity 110*e* formed between an entrance mirror 126 and an output mirror 128. The optical cavity 110*e* is further formed by a hollow core or hollow cross-sectional structure, e.g., a tube 124, the extends between the entrance mirror 126 and an output mirror 128. The tube 124 is configured receive a sample gas having differing dielectric properties than the cavity itself. To this end, the tube 124 includes a sample inlet 124*a* through which a sample gas enters the cavity and a sample outlet 124*b* through which the sample gas exits the cavity. Each of the sample inlet 124*a* and sample outlet 124*b* may be in the form of a linear slot with a predetermined width and extending along a predetermined length of tube 124. The sample inlet 124*a* and the sample outlet 124*b* may be positioned on opposing sides of tube 124 to provide a linear opening in the tube along a transverse direction.

A cavity entrance mirror chamber 118 is located at the entrance of the optical cell 110 and a cavity output mirror chamber 120 is located at the exit of the optical cell 110. The curved entrance mirror 126 is positioned within the cavity entrance mirror chamber 118 and the curved output mirror 128 is positioned within the cavity output mirror chamber 120. The curved entrance mirror 126 and the curved output mirror 128 are positioned facing each other along a longitudinal axis 110*c* to form the optical cavity 110*e*.

The curved entrance mirror 126 and the curved output mirror 128 are configured to reflect light between one another within the optical cavity 110*e*. The mirrors 126, 128 can be spherical, elliptical, or another curved shape. The curved entrance mirror 126 and the curved output mirror 128 are highly reflective so as to minimize light loss within the optical cavity 110*e* of the optical cell 110. In one configuration the, curved entrance mirror 126 and curved output mirror 128 are concave dielectric mirrors of 1 meter radius of curvature having a dielectric coating (e.g., Advanced Thin Films, Boulder, Colo., USA) optimized for maximum reflectivity of about 99.9993% at laser wavelength of about 674 nm.

The curved entrance mirror 126 may include a small area of reflective coating removed to form an aperture 126*a* positioned at the center of the mirror 126. The curved output mirror 128 may also include a small area of reflective coating removed to form an aperture 128*a* positioned at the center of the mirror 128. The apertures 126*a*, 128*a* may also be positioned off center of the mirror surface. The mirror chambers 118 and 120 include inlet ports 118*a* and 120*a* for receiving air capable of purging the optical cavity 110*e* to keep contaminate away from the surfaces of the mirrors 126, 128 and thereby keep the mirrors clean. The inlet port 118*a* is positioned to direct air in front of the curved entrance mirror 126 and the inlet port 120*a* is positioned to direct air in front of the curved output mirror 128. The air through each inlet port 118*a*, 120*a* flows along the surface of its respective mirror 126, 128 and in a direction along the longitudinal axis 110*c* of the optical cavity 110*e*.

With continued reference to FIG. 2, the collimator 112 collects the optical beam 110*d* exiting the optical cavity through the aperture 128*a* in the curved output mirror 128. The collimator 112 is located behind the curved mirror 128 and is aligned to focus the collected optical beam 110*d* into a fiber optic cable that delivers the optical beam 112*a* to a photodetector 114. A processor 116 in communication with the photodetector 114 collects the optical signal from the photodetector 114 and performs measurements using known techniques.

Figure 3A:
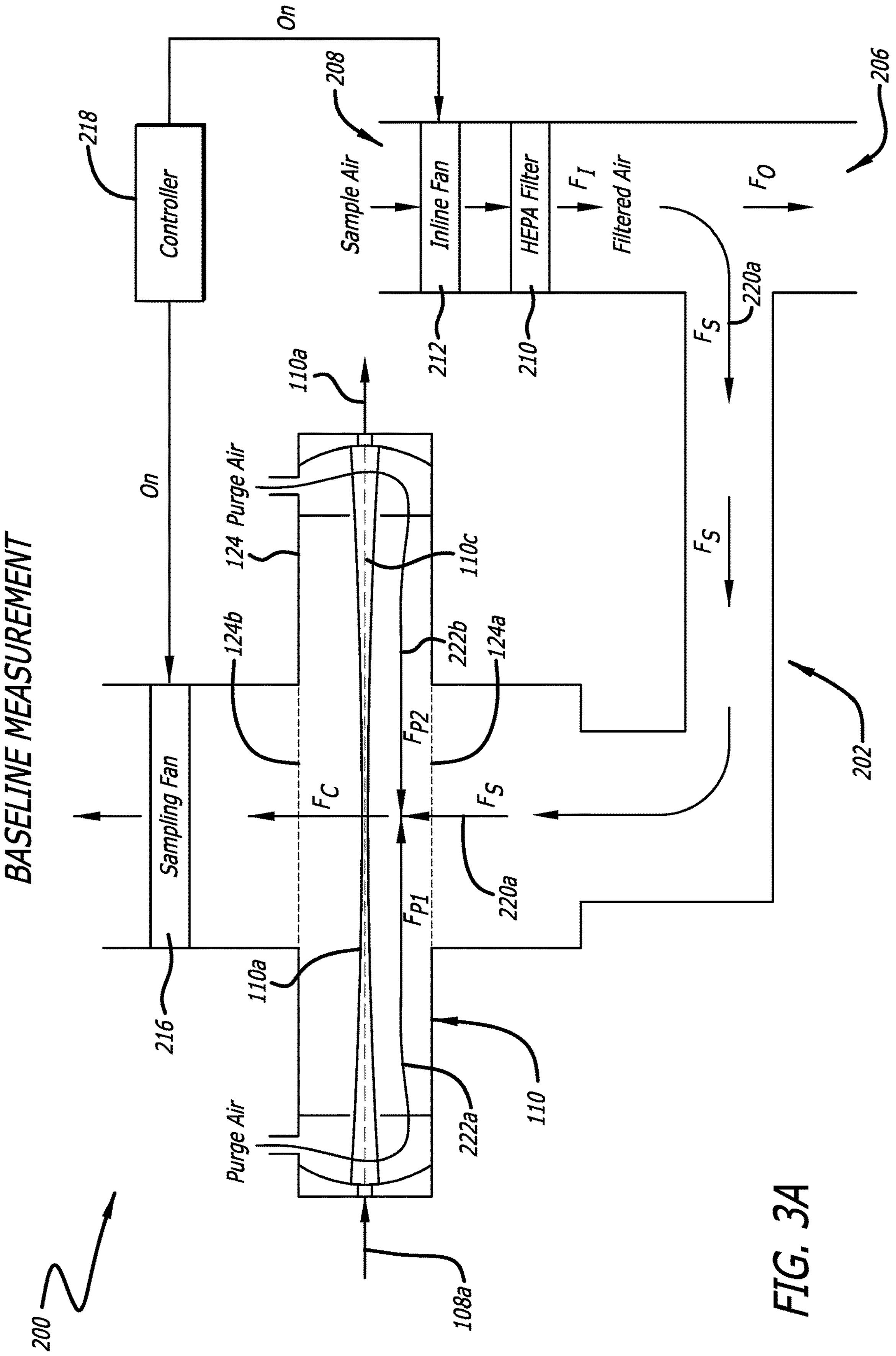
FIGS. 3A and 3B are schematic illustrations of a system for measuring optical extinction, where baseline measurements (FIG. 3A) and sample measurements (FIG. 3B) are obtained under the same airflow conditions.
Figure 3B:
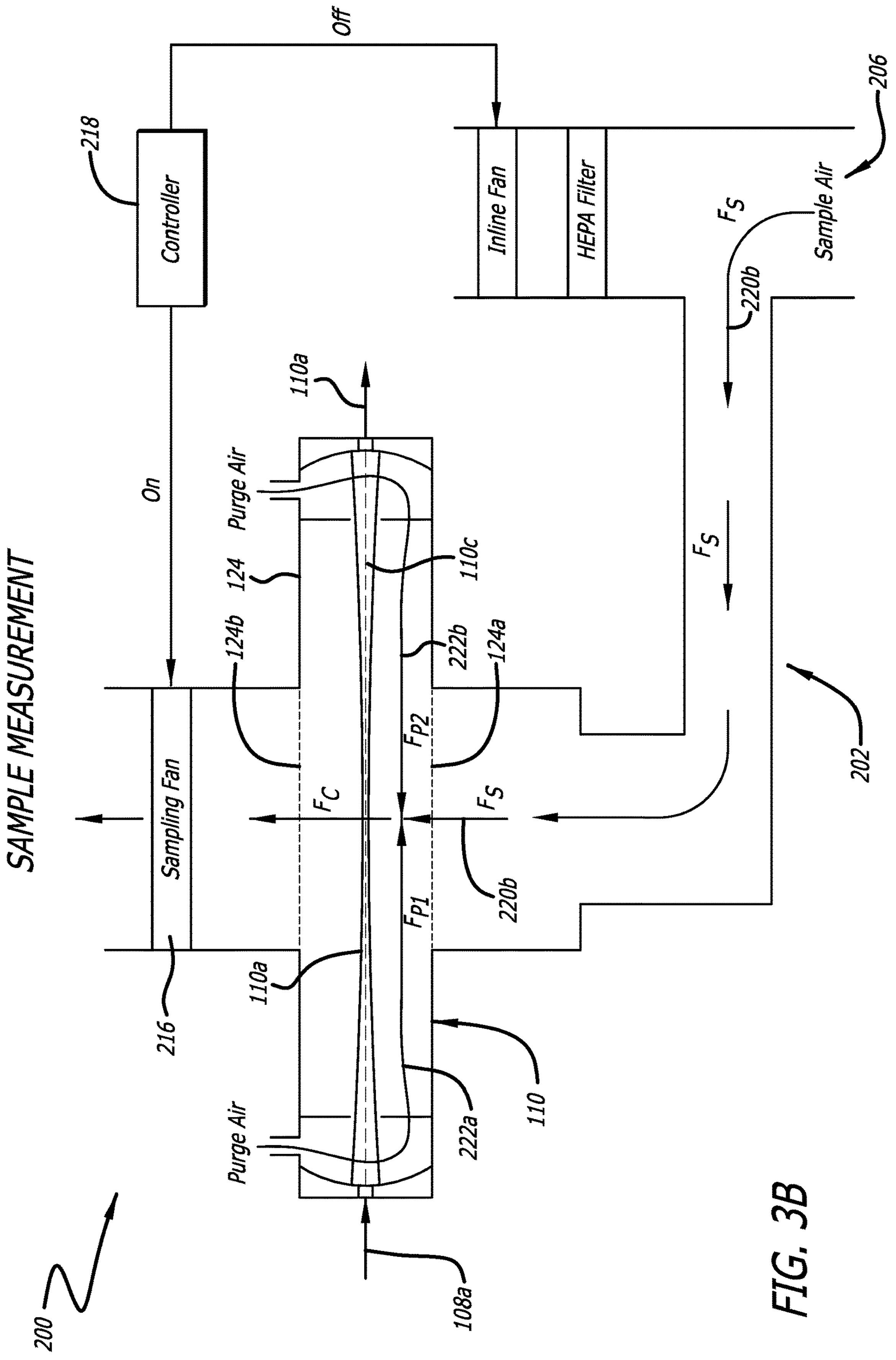

With reference to FIGS. 3A and 3B, an optical extinction analyzer, also referred to as a system 200 for measuring optical extinction, includes an optical cell 110 having an optical cavity 110*e*, a sampling fan 216, a duct system 202, and a controller 218. The optical cell 110 has a sample inlet 124*a* through which a sample of gas (referred to herein as sample gas, sample air, or simply a sample) is input into the optical cavity 100*e*, and a sample outlet 124*b* through which a sample is output from the optical cavity. For ease of illustration, other components of the system 200 are not shown in FIGS. 3A and 3B. For example, the system 200 can include the light source 102, the optical isolator 106, optical components 104, 108, the collimator 112, the photodetector 114, and the processor 116 shown in FIG. 2.

The duct system 202 is coupled to the sample inlet 124*a* of the optical cell 110 so the interior of the duct system is in fluid communication with the optical cavity 110*e* of the optical cell. The coupling may be made using a two-inch diameter hose together with a hose clamp to provide an air tight, seal between a duct outlet of the duct system 202 and the sample inlet 124*a*. The duct system 202 is characterized by an open split configuration, e.g., a T-shape, having an unfiltered inlet 206 and a filtered inlet 208. The unfiltered inlet 206 and the filtered inlet 208 are spaced apart, opposite each other and generally axially aligned. The filtered inlet includes a filter 210 and an inline duct fan 212 arranged to draw a sample from the sample source and force the sample through the filter. In some embodiments the filter 210 is a high efficiency particulate air (HEPA) filter. The sampling fan 216 is associated with, e.g., coupled to, the sample outlet 124*b* of the optical cell 110.

The controller 218 is configured to control the on/off operation of the sampling fan 216 and the inline duct fan 212 during measurement. To this end, and with reference to FIGS. 3A and 3B, the controller 218 cycles the inline duct fan 212 on and off while the sampling fan 216 is continuously on to thereby cycle samples of filtered air through the optical cavity 110*e* for baseline measurements, and samples of unfiltered air through the optical cavity for sample measurements.

With reference to FIG. 3A, baseline measurements of optical loss are obtained when both the sampling fan 216 and the inline duct fan 212 are on. Under these operation conditions, sample air is drawn into the filtered inlet 208 and forced through the HEPA filter 210 by operation of the inline duct fan 212 to become filtered air. The inline flow rate $F_I$ of the filtered air at the output of the HEPA filter 210 is generally equal to the flow rate of the inline fan 212. The filtered air now present in the duct system 202 is then drawn into the optical cavity 110*e* along a flow path 220*a* through the sample inlet 124*a* by operation of the sampling fan 216. The flow path 220*a* of the filtered air transverses the longitudinal axis 110*c* of the optical cell 110. The sample flow rate $F_S$ of the filtered air that is drawn into the optical cavity 110*e* by the sampling fan 216 is generally equal to the flow rate of the sampling fan 216.

During baseline measurements, purge air is input into the optical cavity 110*e* to keep the cavity mirrors of the optical cell clean. The purge air can be provided, for example, by a single head miniature diaphragm pump passed through a 0.1 micron Teflon membrane filter. After contacting the surfaces of the mirrors, the flow paths 222*a*, 222*b* of the purge air extend generally in the direction of the longitudinal axis 110*c* and converge with the flow path 220*a* of the filtered air. As a result, the cavity flow rate $F_C$ of the filtered air within the optical cavity 110*e* is generally equal to the sample flow rate $F_S$ of filtered air drawn from the duct system 202 by the sampling fan 216 plus the flow rates $F_{P1}$, $F_{P2}$ of the purge air input by the purge fans. Baseline measurements are obtained under particle-free conditions based on the filtered air flowing through the optical cavity 110*e* along the flow path 220*a* at a cavity flow rate $F_C$.

With continued reference to FIG. 3A, the inline duct fan 212 is configured such that the inline flow rate $F_I$ through the HEPA filter 210 exceeds the sample flow rate $F_S$ of the sampling fan 216 so that the sampling fan draws filtered air from the duct system 202—without drawing unfiltered air from the unfiltered inlet 206. In one configuration, the inline flow rate $F_I$ through the HEPA filter 210 exceeds the sample flow rate $F_S$ of the sampling fan 216 by at least a factor of two. Because the inline flow rate $F_I$ exceeds the sample flow rate $F_S$, a portion of the filtered air is output from the duct system 206 through the unfiltered inlet 206, where the output filtered air is output at an output flow rate $F_O$ equal to the difference between the inline flow rate $F_I$ and the sample flow rate $F_S$.

With reference to FIG. 3B, sample measurements of optical loss are obtained when the sampling fan 216 is on and the inline duct fan 212 is off. Under these operation conditions, sample air is drawn into the duct system 202 through the unfiltered inlet 206 by operation of the sampling fan 216 without drawing filtered air from the filtered inlet 208. The unfiltered sample air is then further drawn into the optical cavity 110*e* along the flow path 220*b* through the sample inlet 124*a* by operation of the sampling fan 216. The flow path 220*b* of the unfiltered sample air transverses the longitudinal axis 110*c* of the optical cell 110. The sample flow rate $F_S$ of the unfiltered air that is drawn into the optical cavity 110*e* is generally equal to the flow rate of the sampling fan 216.

During sample measurements, purge air is input into the optical cavity 110*e* by purge fans (not shown) to keep the cavity mirrors of the optical cell clean. After contacting the surfaces of the mirrors, the flow paths 222*a*, 222*b* of the purge air extend generally in the direction of the longitudinal axis 110*c* and converge with the flow path 220*b* of the filtered air. As a result, the cavity flow rate $F_C$ of the filtered air within the optical cavity 110*e* is generally equal to the sample flow rate $F_S$ of unfiltered air drawn from the duct system 202 by the sampling fan 216 plus the flow rates $F_{P1}$, $F_{P2}$ of the purge air input by the purge fans. Sample measurements are obtained based on the unfiltered air flowing through the optical cavity 110*e* along the flow path 220*b* at a cavity flow rate $F_C$.

Figure 1:
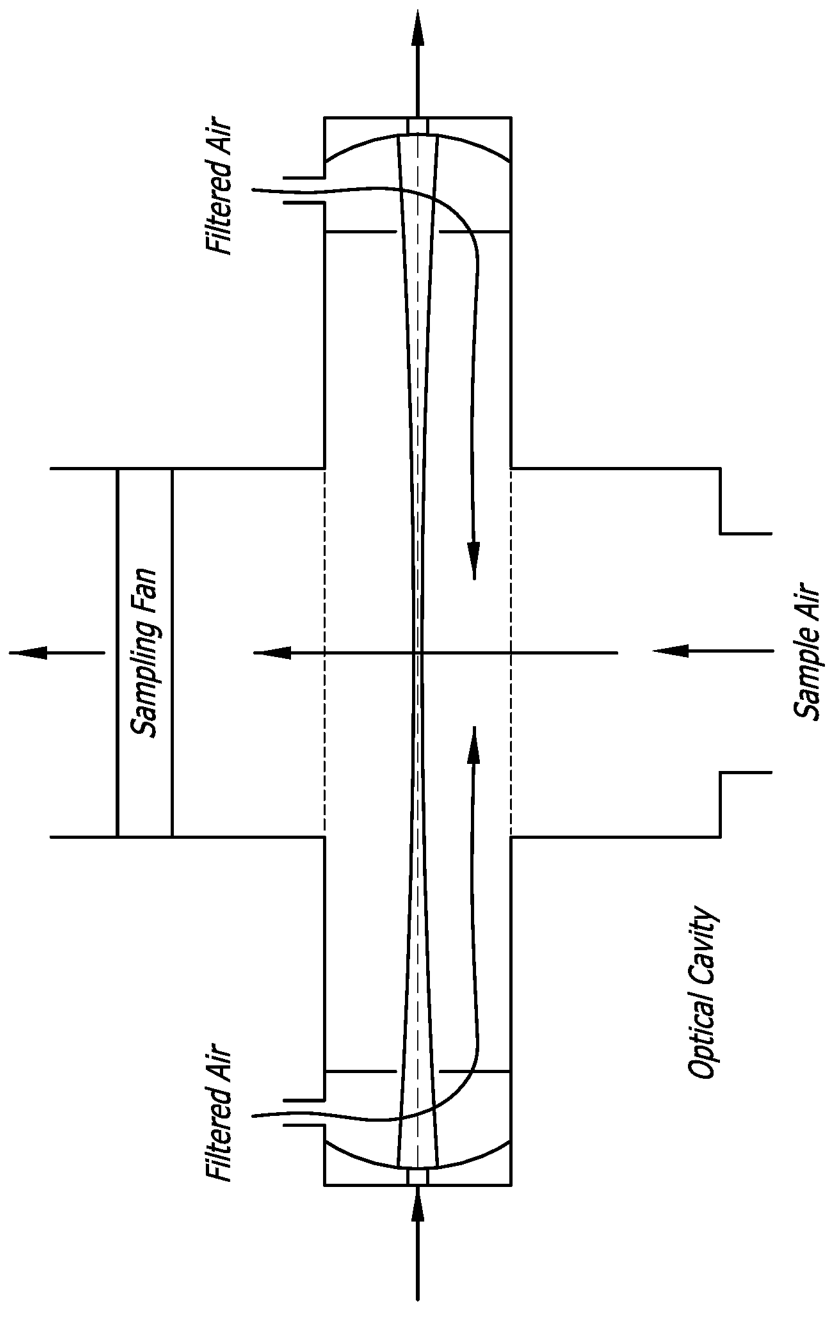
FIG. 1 (Prior Art)
FIG. 1 is a schematic illustrations of a prior art optical extinction analyzer.

In comparing the air flow rates of FIGS. 3A and 3B, the cavity flow rate $F_C$ of the filtered air (shown in FIG. 3A) is the same as the cavity flow rate $F_C$ of the sample air (shown in FIG. 3B). In comparing the air flow paths of FIGS. 3A and 3B, the flow path 220*a* of the filtered air (shown in FIG. 3A) is the same as the flow path 220*b* of the sample air (shown in FIG. 3B). Thus, the system 200 disclosed herein allows the sample measurements and the baseline measurements to be taken under the same airflow conditions, where the flow rates through the optical cavity 110*e* and flow paths through the optical cavity are the same during the sample measurements and the baseline measurements. In some embodiments, the temperature within the optical cavity 110*e* is the same during the sample measurements and the baseline measurements. Thus, the system 200 avoids the different baseline and sample airflow conditions of known systems described above with reference to FIG. 1 and the optical loss associated with differential refractivity experienced by known systems.

Figure 4:
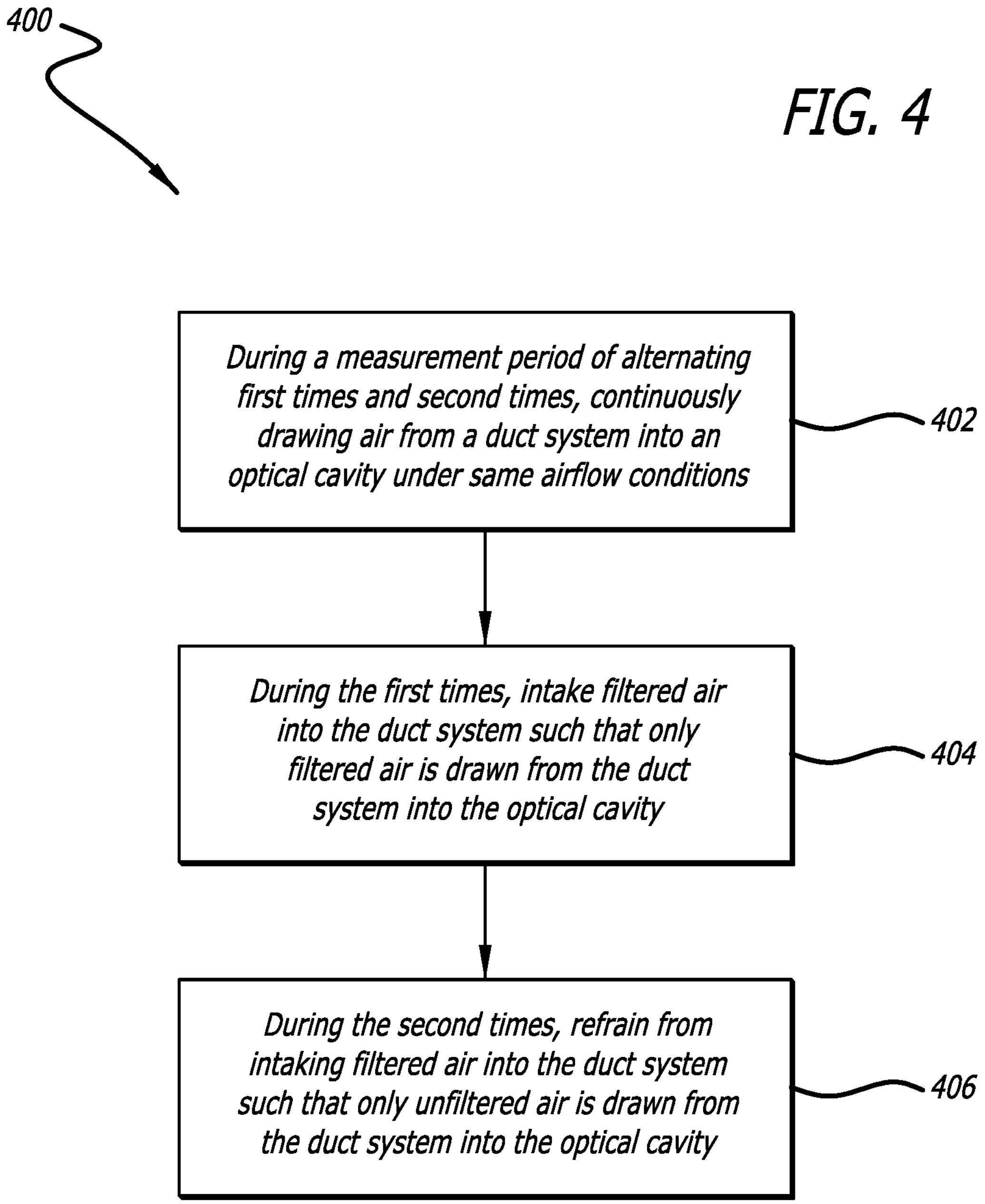
FIG. 4 is a flowchart of a method of measuring optical extinction.

FIG. 4 is a flowchart of a method of measuring optical extinction. The method may be implemented by the system 200 of FIGS. 3A and 3B.

At block 402, during a measurement period comprising alternating first times and second times, air is continuously drawn from a duct system into an optical cavity under the same airflow conditions, e.g., same flow rate and same flow path. To this end and with reference to FIGS. 3A and 3B, air is continuously drawn from a duct system 202 into an optical cavity 110*e* of an optical cell 110 by a sampling fan 216 that is continuously on during the measurement period. The same airflow conditions can include a same cavity flow rate $F_C$ within and through the optical cavity 110*e* that is based on the sample flow rate $F_S$ of the sampling fan 216. The same cavity flow rate $F_C$ may be further based on the flow rates $F_{P1}$, and $F_{P2}$ of purge air input to the optical cavity 110*e*. For example, the same cavity flow rate $F_C$ may be the sum of $F_S$, $F_{P1}$, and $F_{P2}$. The same airflow conditions can also include a same flow path through the optical cavity that is based on the arrangement of the sampling fan 216, the optical cavity and the duct system 202. For example, in the arrangement of FIGS. 3A and 3B the flow paths 220*a*, 220*b* transverse the longitudinal axis 110*c* of the optical cell 110. The same airflow conditions may also include air temperature that is based on the temperature of the environment in which the duct system 202 is placed.

At block 404, during the first times (which may have a duration between 30 seconds and 60 seconds) of the measurement period, filtered air is taken into the duct system 202 such that only filtered air is drawn from the duct system into the optical cavity 110*e*; and baseline measurements of optical loss are obtained during the first times. To this end and with reference to FIG. 3A, the inline duct fan 212 is turned on and sample air is forced through the HEPA filter 210 and into the duct system 202. As described above, the inline duct fan 212 is configured to force the sample air through the HEPA filter 210 at an intake flow rate $F_I$ greater than the sample flow rate $F_S$ of the sampling fan 216. In some embodiments, the intake flow rate $F_I$ is at least two times greater than the sample flow rate $F_S$. For example, the intake flow rate $F_I$ provided by the inline duct fan 212 may be 300 liters per minute, while the sample flow rate $F_S$ of the sampling fan 216 may be 100 liters per minute. In this configuration, some filtered air input to the duct system 202 is drawn toward the sampling fan 216 at the sample flow rate $F_S$ of 100 liters per minute, while other filtered air is forced out of the duct system through the unfiltered inlet 206 at an output flow rate $F_O$ of 200 liters per minute.

The output of filtered air through the unfiltered inlet 206 prevents unfiltered air from entering the duct system. Thus, only filtered air flows into the optical cavity 110*e*. Within the optical cavity 110*e* the filtered air flows at a cavity flow rate $F_C$, which can be equal to the sample flow rate $F_S$ (100 liters per minute). However, as mentioned above the cavity flow rate $F_C$ may be affected by the flow of purge air within the optical cavity 110*e*. For example, purge air may be input to the optical cavity 110*e* at a flow rate of 1 liter per minute, in which case the cavity flow rate $F_C$ is the sum of the sample flow rate $F_S$ (100 liters per minute) plus the flow rates $F_{P1}$ (1 liter per minute) and $F_{P2}$ (1 liter per minute) of purge air.

At block 406, during the second times (which may have a duration between 60 seconds and 300 seconds) of the measurement period, filtered air is not taken into the duct system 202 such that only unfiltered sample air is drawn from the duct system into the optical cavity 110*e*; and sample measurements of optical loss are obtained during the second times. To this end and with reference to FIG. 3B, the inline duct fan 212 is turned off and unfiltered air is drawn into the duct system 202 through the unfiltered inlet 206 at a flow rate $F_S$ by the sampling fan 216, which is continuously on. Within the optical cavity 110*e* the unfiltered air flows at a cavity flow rate $F_C$, which can be equal to the sample flow rate $F_S$ (100 liters per minute). However, as mentioned above the cavity flow rate $F_C$ may be affected by the flow of purge air within the optical cavity 110*e*. For example, purge air may be input to the optical cavity 110*e* at a flow rate of 1 liter per minute, in which case the cavity flow rate $F_C$ is the sum of the sample flow rate $F_S$ (100 liters per minute) plus the flow rates $F_{P1}$ (1 liter per minute) and $F_{P2}$ (1 liter per minute) of purge air.

The prominent advantage of the system 200 disclosed herein is the improvement of the accuracy of aerosol optical extinction coefficient measurements due to the reduction of differential refractivity. Since differential refractivity can contribute anywhere between 1 and 20 Mm−1 to the measured extinction coefficients, depending on airflow conditions (flow rate, flow path, temperature), alignment of the laser beams relative to the input cavity mirror, mirror cleanliness, and homogeneity of the reflectivity of the mirror surface, a typical aerosol extinction coefficient measurement of 20 Mm−1 is subject to inaccuracies up to 100%. Measurements where the extinction coefficient is much higher are less affected. For example, a measured value of 500 Mm−1 would have an uncertainty of 20/500=4%, which is typically an acceptable amount of error.

The upper bound for wavelength dependent inaccuracies due to differential refractivity that are typically seen in known optical extinction analyzers are as follows: ~20 Mm−1 at 405 nm; ~10 Mm−1 at 520 nm; ~7 Mm−1 at 635 nm; ~5 Mm−1 at 1060 nm; and ~2 Mm−1 at 1650 nm. These values establish the magnitude of the inaccuracy that is eliminated by the system 200 disclosed herein.

Figure 5A:
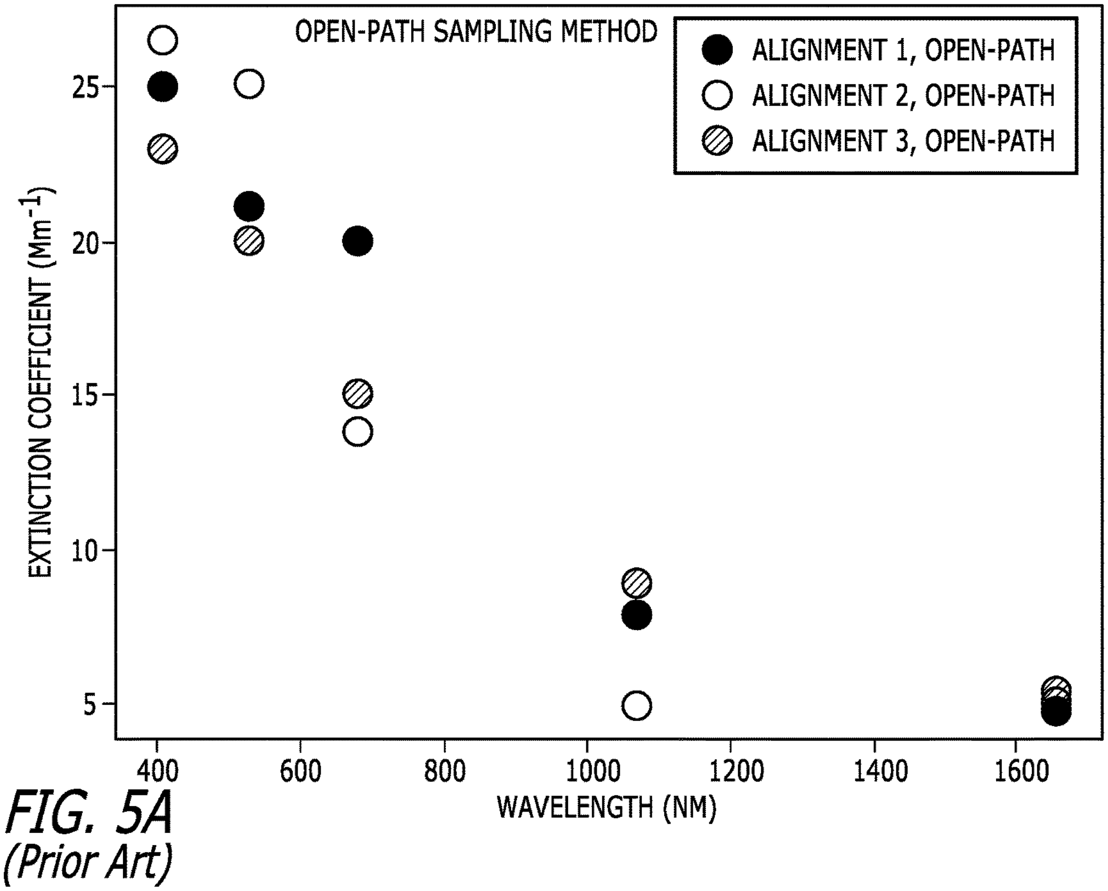
FIG. 5A (Prior Art)
FIG. 5A is a graph of optical extinction measurements obtained by a prior art optical extinction analyzer.
Figure 5B:
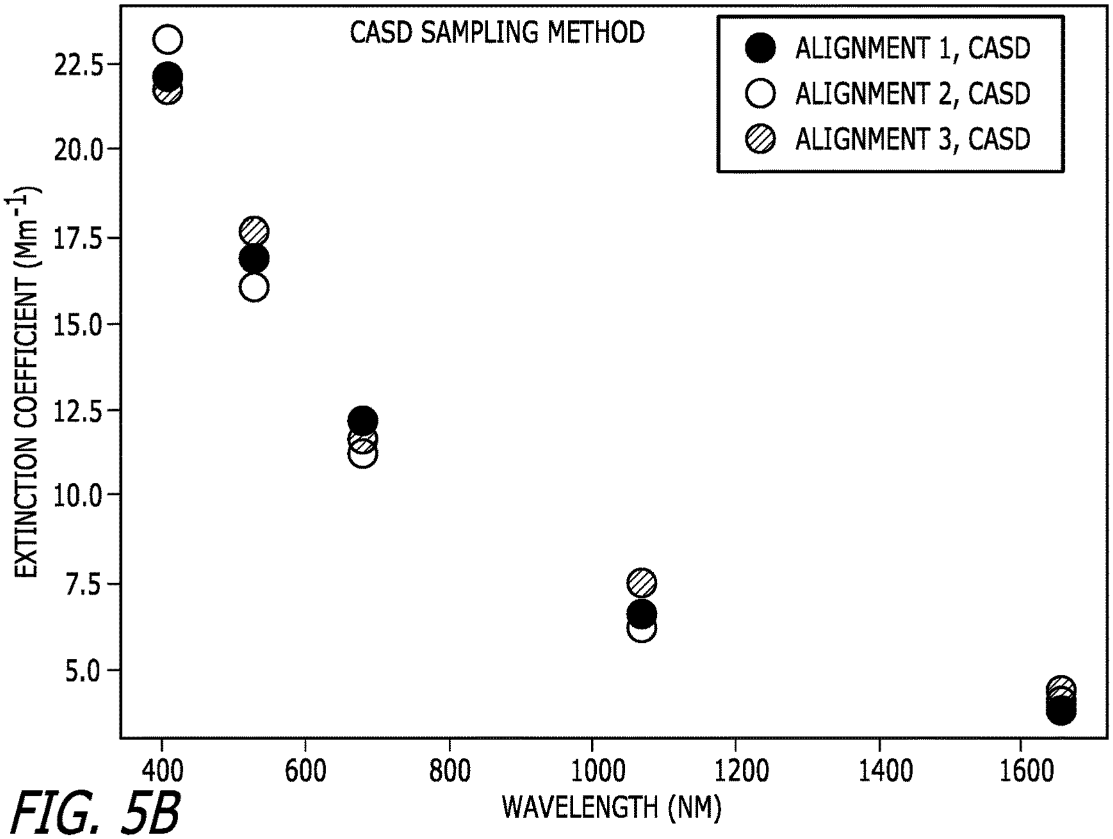
FIG. 5B is a graph of optical extinction measurements obtained by an optical extinction analyzer as disclosed herein.

With reference to FIGS. 5A and 5B, optical extinction coefficients were measured as a function of laser wavelength under three different alignments of each incident laser beam using the prior art open-path sampling method (FIG. 5A) and the continuous airflow sampling duct (CASD) method disclosed herein (FIG. 5B). Note, in the graphs of FIGS. 5A and 5B the vertical scales for optical extinction coefficients are slightly different.

With reference to FIG. 5A, the measured values of optical extinction coefficient for the three different laser beam alignments using the open-path sampling method have a significant spread at four of the five laser wavelengths. The spread in measured values is due to changes in the position of the beam on the cavity mirrors between baseline measurements and sample measurements, which changes in position occur when measurements are obtained under different airflow conditions. The changes in beam positions between baseline and sample measurements produce a laser alignment dependent uncertainty.

With continued reference to FIG. 5A, averaging the standard deviation of each set of points at each wavelength gives the magnitude of this laser alignment dependent uncertainty as +/−2.0 $Mm^{-1}$. Note, the variance in measured optical extinction at 1650 nm is smaller than for the other wavelengths because the 1650 nm cavity mirrors are by chance less contaminated than the others. A secondary effect lies in the fact that the distance over which a beam is displaced upon refracting depends on the difference in refractive index across the boundary between the two flows, which in this case increases for decreasing wavelength.

With reference to FIG. 5B, the measured values of optical extinction coefficient for the three different laser beam alignments using the continuous airflow sampling duct (CASD) method disclosed herein have a spread that is less than the spread resulting from open-path sampling method (FIG. 5A). The smaller spread in measured values is due to an unchanging position of the laser beam on the cavity mirrors between baseline measurements and sample measurements, which unchanging position occur when the measurements are obtained under same airflow conditions. The unchanging beam positions between baseline and sample measurements produce a significantly less and essentially negligible laser alignment dependent uncertainty. With continued reference to FIG. 5B, averaging the standard deviation of each set of points at each wavelength gives the magnitude of this alignment dependent uncertainty as +/−0.3 $Mm^{-1}$.

Other advantages of the system 200 disclosing herein include:

1) In known optical extinction analyzers the magnitude of the effect of differential refractivity is highly dependent on mirror cleanliness, which suggests that refraction causes the laser beam to explore a different portion of the mirror surface, which will give rise to either more or less optical loss depending on the exact conditions at the mirror. An advantage of the system and method disclosed herein is a reduction in the dependence of measurement accuracy on keeping the mirrors scrupulously clean. In other words, the system disclosed herein produces accurate values under suboptimal mirror conditions, and less time and effort are needed to clean the cavity mirrors.

2) The system disclosed herein eliminates the need to open and close the optical cavity, as required by known optical extinction analyzers, such as disclosed in U.S. Pat. No. 9,709,491. This reduces the likelihood of contamination of interior components, such as the mirrors. It also eliminates the need for an optical cell with an opening/closing mechanism and thereby reduces the complexity, cost and weight of the analyzer.

3) The system 200 disclosed herein, with its continuously running the sampling fan 216, establishes the same airflow conditions for both the filtered purge air and unfiltered sample air. In known optical extinction analyzers, the purge air flow path empties into an optical cavity that lacks a well-defined outlet path. This makes it more difficult to control and correctly model air flow through the optical cavity.

4) The duct system 202 can attach to the remainder of the system 200 via a flexible hose. Thus, the duct system 202 component of the system 200 can be placed remote from the rest of the system, e.g., such as the light source 102, the optical isolator 106, the optical components 104, 108, the optical cell 110, the collimator 112, the photodetector 114 and the processor 116 shown in FIG. 2. This allows different locations to be sampled without having to move delicate and sensitive components of the system. This also allows the measurement components of the system to run indoors while sampling outdoor air, allowing the components to be protected from environmental conditions.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A system for measuring optical extinction comprising:
- an optical cell having an optical cavity, a sample inlet, and a sample outlet;
- a duct system having an interior in fluid communication with the optical cavity through the sample inlet, the duct system including an unfiltered inlet, and a filtered inlet with a filter and an inline duct fan arranged to draw a sample from a sample source and force the sample through the filter;
- a sampling fan associated with the sample outlet; and
- a controller configured to cycle the inline duct fan on and off while the sampling fan is on to thereby cycle filtered samples and unfiltered samples through the optical cavity.

2. The system of claim 1, wherein the sampling fan is arranged to draw filtered samples from the interior of the duct system through the sample inlet along a flow path, and to draw unfiltered samples from the interior of the duct system through the sample inlet along the flow path.

3. The system of claim 2, wherein the optical cell comprises a pair of opposed mirrors and a longitudinal axis extending between the pair of opposed mirrors and the flow path through the sample inlet transverses the longitudinal axis.

4. The system of claim 3, wherein the flow path is orthogonal the longitudinal axis.

5. The system of claim 1, wherein the sampling fan and the inline duct fan are respectively configured such that responsive to the inline duct fan being on the sampling fan draws filtered samples from the duct system without drawing unfiltered samples from the duct system.

6. The system of claim 5, wherein the inline duct fan is configured such that the flow rate through the filter exceeds the flow rate of the sampling fan.

7. The system of claim 6, wherein the flow rate through the filter exceeds the flow rate of the sampling fan by at least a factor of two.

8. The system of claim 1, further comprising a processor coupled to the optical cavity and configured to:

obtain baseline measurements based on samples of filtered air, and obtain sample measurements based on samples of unfiltered air.

9. A method of measuring optical extinction, comprising:

during a measurement period comprising alternating first times and second times, continuously drawing air from a duct system into and through an optical cavity under same airflow conditions;

during the first times of the measurement period, intaking filtered air into the duct system such that only filtered air is drawn from the duct system into and through the optical cavity; and during the second times of the measurement period, refraining from intaking filtered air into the duct system such that only unfiltered air is drawn from the duct system into and through the optical cavity, wherein:

the same airflow conditions include a cavity flow rate through the optical cavity, the cavity flow rate is based on a sample flow rate at which air is drawn from the duct system into the optical cavity, and intaking filtered air into the duct system comprises forcing sample air through a filter and into the duct system at an intake flow rate greater than the sample flow rate.

10. The method of claim 9, wherein the intake flow rate is at least two times greater than the sample flow rate.

11. The method of claim 9, wherein the cavity flow rate is further based on one or more purge air flow rates within the optical cavity.

12. The method of claim 9, wherein the same airflow conditions include a flow path through the optical cavity.

13. The method of claim 9, wherein the same airflow conditions include a temperature within the optical cavity.

14. The method of claim 9, wherein:

the first times have a duration between 30 seconds and 60 seconds; and the second times have a duration between 60 seconds and 300 seconds.

15. The method of claim 9, further comprising obtaining baseline measurements of optical loss during the first times.

16. The method of claim 9, further comprising obtaining sample measurements of optical loss during the second times.

17. A duct system for use with an optical cell having an optical cavity and a sample inlet, the duct system comprising:

a filtered inlet;

a filter associated with the filtered inlet;

an inline duct fan associated with the filtered inlet and arranged to draw air from a sample source and force the air through the filter;

an unfiltered inlet arranged relative to the filtered inlet such that the air forced through the filter can follow an outlet flow path that exits the interior of the duct system through the unfiltered inlet; and a duct outlet configured to couple with the sample inlet of the optical cell and arranged relative to the filtered inlet and the unfiltered inlet to provide a sample flow path for the air into the optical cavity.

18. The duct system of claim 17, wherein the unfiltered inlet is axially aligned with the filtered inlet.

* * * * *